United States Patent [19]
Hoeptner, III

[11] Patent Number: 5,997,046
[45] Date of Patent: Dec. 7, 1999

[54] DIVERGENT LEGGED SLIDE MOUNT ADAPTER

[76] Inventor: Herbert W. Hoeptner, III, 7796 Oak Springs Cir., Gilroy, Calif. 95020

[21] Appl. No.: 09/033,418

[22] Filed: Mar. 2, 1998

[51] Int. Cl.⁶ ..................................................... F16L 41/06
[52] U.S. Cl. .......................... 285/27; 285/325; 166/85.2; 166/242.6
[58] Field of Search ................................. 285/18, 24, 27, 285/133.4, 325, 326, 327, 133.11, FOR 138; 166/85.4, 88.4, 85.2, 242.6

[56] References Cited

U.S. PATENT DOCUMENTS

| | | |
|---|---|---|
| 196,384 | 10/1877 | Porteous . |
| 519,728 | 5/1894 | McGowan . |
| 1,786,357 | 12/1930 | Miller . |
| 1,987,883 | 1/1935 | White et al. . |
| 2,580,199 | 12/1951 | Schmid . |
| 2,598,968 | 6/1952 | Boosey . |
| 2,605,781 | 8/1952 | Schmid et al. . |
| 2,664,096 | 12/1953 | Murdock et al. . |
| 3,017,896 | 1/1962 | Papacek . |
| 3,430,697 | 3/1969 | Wellstein ............................... 166/85.2 |
| 3,770,003 | 11/1973 | Uroshevich . |
| 3,847,217 | 11/1974 | Kramer et al. ...................... 285/325 X |
| 3,869,000 | 3/1975 | English ................................ 285/325 X |
| 3,885,585 | 5/1975 | Carpentier . |
| 4,037,654 | 7/1977 | Lien ..................................... 285/325 X |
| 4,056,144 | 11/1977 | Wellstein ............................ 166/88.4 X |
| 4,109,671 | 8/1978 | Hughes et al. . |
| 4,653,521 | 3/1987 | Fillman . |
| 4,653,522 | 3/1987 | Fillman et al. . |
| 4,854,339 | 8/1989 | Hoeptner, III . |
| 5,033,500 | 7/1991 | Hoeptner, III . |
| 5,355,907 | 10/1994 | Hoeptner, III . |
| 5,701,925 | 12/1997 | Mulligan et al. . |

Primary Examiner—Lynne H. Browne
Assistant Examiner—Greg Binda
Attorney, Agent, or Firm—William W. Haefliger

[57] ABSTRACT

For use in a longitudinally elongated pipe having a pipe wall, the combination comprises first and second relatively slidably interconnectible structures, the first structure to be carried by the pipe wall, and the second structure adapted for lengthwise movement in the pipe; the structures having slidably interconnectible tongue and groove elements; a cam on one of the structures, and a guide on the other of the structures, are interengageable in response to lengthwise movement of the second structure, for relatively aligning the structures to enable slidable interconnection thereof. The guide may take the form of guiding and stabilizing legs.

14 Claims, 5 Drawing Sheets

DIVERGENT LEGGED SLIDE MOUNT ADAPTER

BACKGROUND OF THE INVENTION

This invention relates generally to provision of improved means to establish a fluid passing side port extending sidewardly from a body within a pipe, as for example by remote manipulation of the body. Also it has particular application to freeze resistant water supply installations; such as installation in a well pipe of apparatus to control water flow sidewardly from the well.

Freezing of water in flow control apparatus in wells, as for example in remote locations, such as farms, ranches, and other locations, etc., is a persistent problem. Attempts to overcome this problem have led to development of apparatus installable in a water supply well, to redirect water flow from an upward direction to a lateral, as for example horizontal, flow direction, below the ground surface.

There is need for improved equipment or apparatus, which can be lowered into the well from the surface and manipulated, to establish the lateral redirection of flow. To this end, there is great need for simple apparatus which can be lowered into a well, as via elongated lift out support structure, and then manipulated solely via the same support structure, to establish the needed side connection to an underground sideward flow line, for thereby achieving upward water flow diversion in the well to the underground flow line, all without digging up the earth to gain access to the side connection.

SUMMARY OF THE INVENTION

It is a major object of the invention to provide simple, reliable flow control apparatus that meets the above needs, whereby only one elongated support, such as a lift-out rod, need be manipulated to achieve the underground remote connection. Basically, the invention is adapted for use in combination with a tubular casing to be sunk or installed in a well bore, the casing having a side wall through port.

The invention generally is adapted for use in a longitudinally elongated pipe, such as well casing, and includes a) first and second relatively slidably interconnectible structures, the first structure to be carried by the pipe wall, and the second structure adapted for lengthwise movement in the pipe, b) said structures having slidably interconnectible tongue and groove elements, c) a cam on one of said structures, d) and a guide on the other of the structures, to interengage the cam in response to lengthwise movement of the other structure, for relatively aligning said structures to enable slidable interconnection thereof, with registration of ports in the other structure and at the side wall.

It is another object to provide a projection on the one structure, and which defines the cam, for example to provide camming surfaces which taper in the direction of pipe elongation.

A further object is to provide leg means on the other structure, and which defines the guide, the leg means for example including two laterally spaced legs to guidingly receive the cam therebetween. The cam tapered surfaces are respectively engageable with the respective legs, thereby to align the tongue and groove elements for slidable longitudinal interconnection, to establish port-to-port registration. The legs may also stabilize the second structure in the wall bore.

Yet another object is to provide a side nipple carried by the first structure to be received in a pipe side wall through port. In this regard, the second structure may typically include a hollow body to which primary tubing is connected to extend lengthwise in the pipe to pass fluid; also, secondary tubing or a rod may be connected to the hollow body to extend lengthwise in said pipe, and generally oppositely from said primary tubing, to facilitate manual manipulation of the second structure.

These and other objects and advantages of the invention, as well as the details of an illustrative embodiment, will be more fully understood from the following specification and drawings, in which:

DRAWING DESCRIPTION

DETAILED DESCRIPTION

Figure 2:
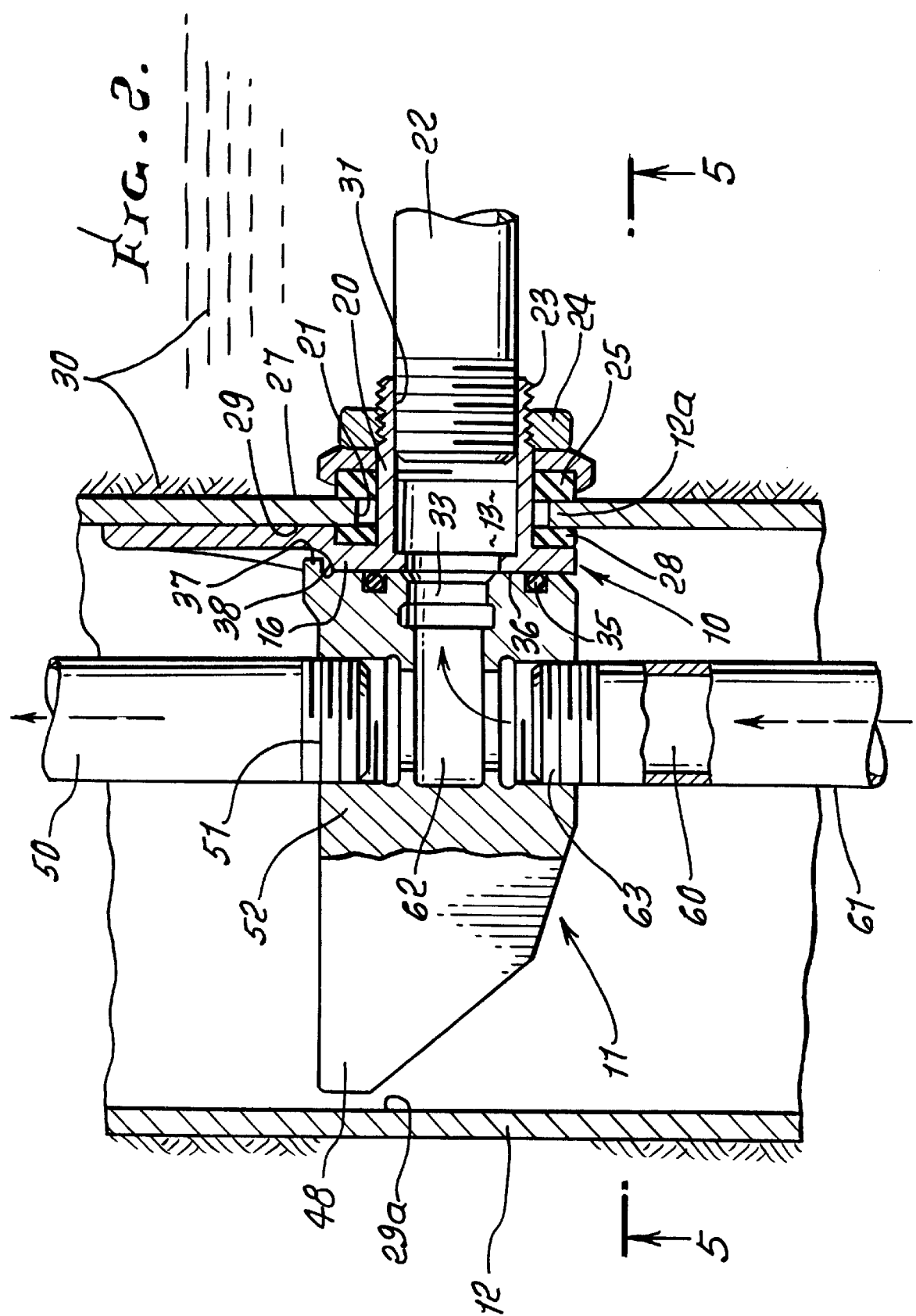
FIG. 2 is an enlarged side elevation showing the two structures.
Figure 3:
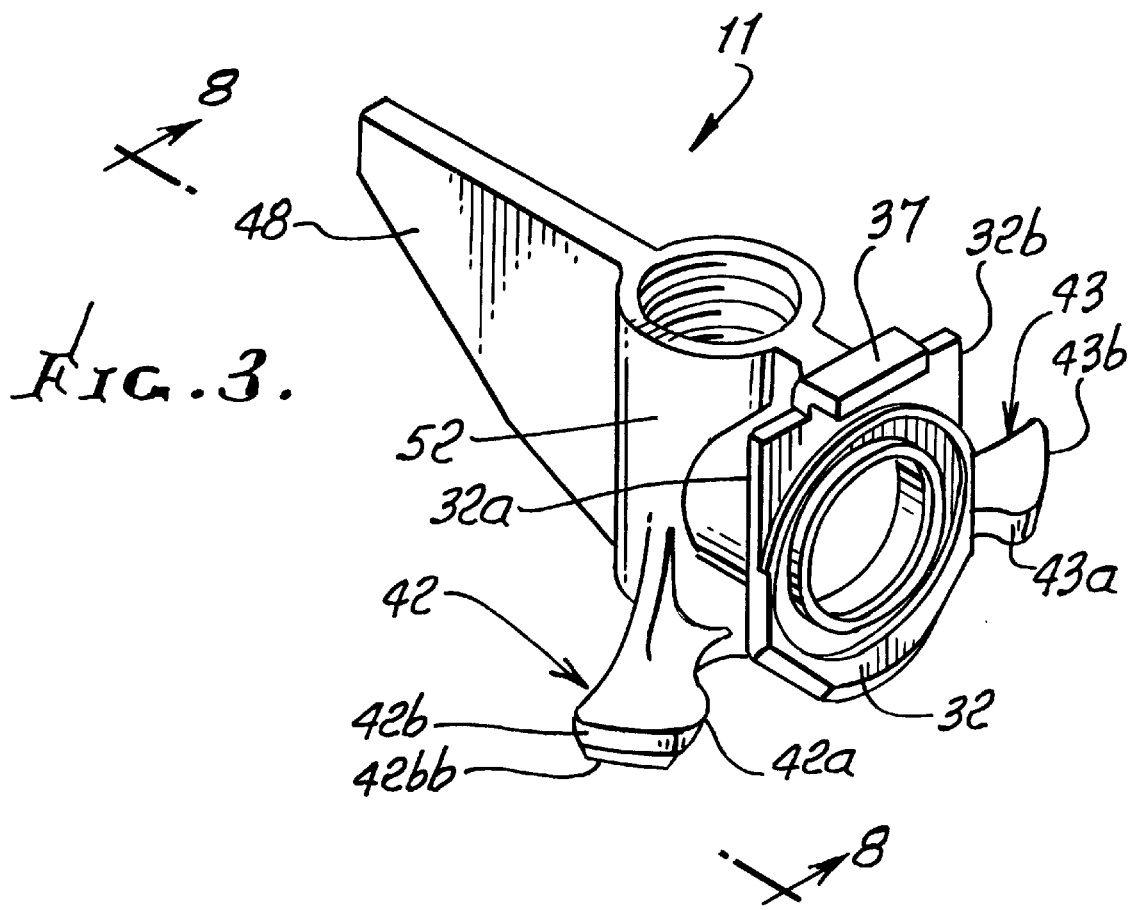
FIGS. 3 and 4 are exploded perspective views showing the first and second slidably interconnectible structures.
Figure 4:
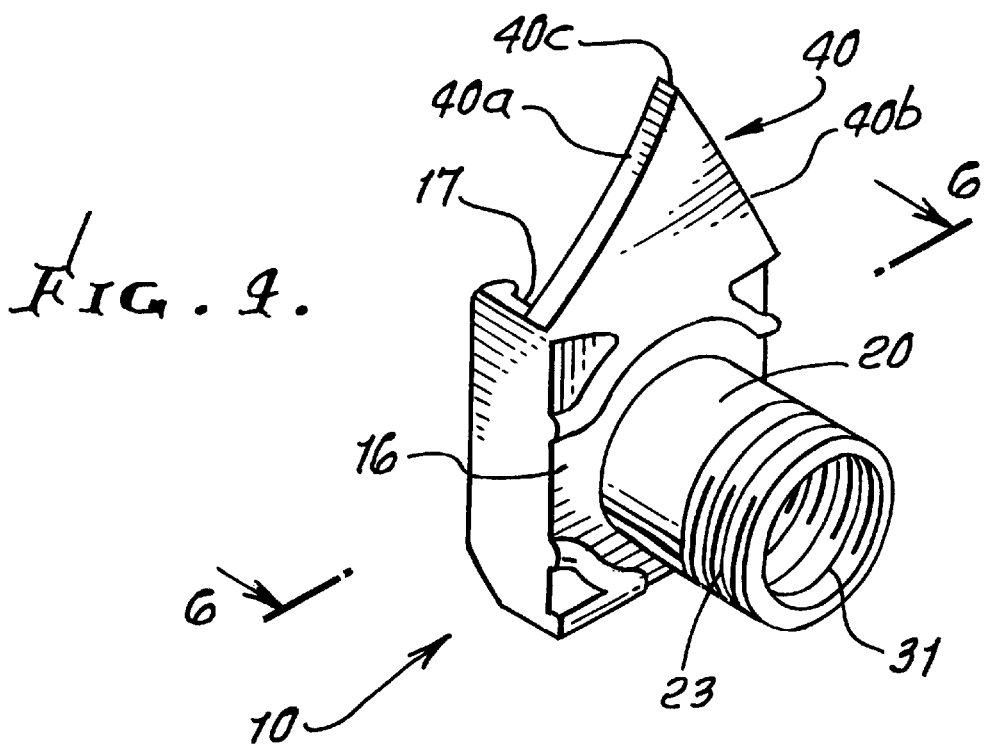

In FIGS. 3 and 4, first and second relatively slidably interconnectible structures are shown at 10 and 11. Such structures are adapted for reception in an elongated pipe, such as a well casing, shown at 12 in FIGS. 1 and 2. The first structure 10 is configured to be carried by the pipe wall at 12a, as by installation at or on that wall, to define a fluid passing side port 13 through that wall. The second structure 11 is configured to be displaced lengthwise in the pipe; as for example longitudinally, laterally, and relatively generally about the pipe axis, and as from a remote location, to effect its slidable interconnection with structure 10. An elongated pipe or rod 50 is connected at 51 to the body 52 of second structure 11, to enable such manipulation, as from the wall surface. Connector 51 may be threaded to enable removal of 50 after 11 is connected to 10.

The two structures have slidably interconnectible tongue and groove elements. As shown in FIGS. 4, 5, 6 and 7, structure 10 has a body 16 which defines longitudinally extending laterally spaced grooves 17 and 18, each in the form of a sideward J-slot as viewed in FIG. 5. Such retention grooves are exposed at the inner side of the pipe wall at 12a, and a nipple 20 integral with body 16 projects sidewardly through pipe wall port 21, as shown by FIG. 2, for connection to external pipe 22, as for example underground. See formation 30. Threading 23 on the nipple may receive a clamping nut 24, which clamps an annular seal 25 against the pipe exterior wall 27. An annular seal 28 is also thereby clamped between the body 16 and the pipe interior wall or bore 29. Nipple interior thread has thread connection at 31 to underground pipe 22. See FIG. 2.

A tongue element 32 on structure 11 is downwardly slidably receivable into the two grooves 17 and 18, when structure 11 is properly aligned with such grooves. The tongue has wings 32a and 32b that are respectively receivable into the grooves. Such downward reception brings side port 33 in hollow body 52 of the second structure into registration with port 13, as seen in FIG. 2. An annular seal 35 carried by body 34 then seals off against inner surface 36 of body 16. Lip 37 on body 52 seats at 38 on body 16 to limit downward reception of the tongue element 32 in the retention grooving 17 and 18.

As referred to, proper relative alignment of the movable second structure 11 with respect to the first structure, is needed in order to enable slidable interconnection of the retention tongue and grooving elements. Such alignment includes vertical and lateral alignment, and relative rotational (azimuthal) alignment. To this end, an alignment cam is provided on one of the structures 10 and 11, and a guide is provided on the other of the structures, to interengage the cam in response to relative lengthwise movement of the two structures, for relatively azimuthally aligning the two structures to bring the tongue into lengthwise alignment with the grooving, as referred to.

In the example (a preferred form of the invention, although there may be other functionally equivalent forms), the cam is defined by a lengthwise extending projection 40 on the body 16 of the first structure 10. The cam has guide camming surfaces 40a and 40a, which taper in the direction of pipe elongation, and define an apex 40c. The cam projects beyond, for example above, the grooving 17 and 18.

Figure 5:
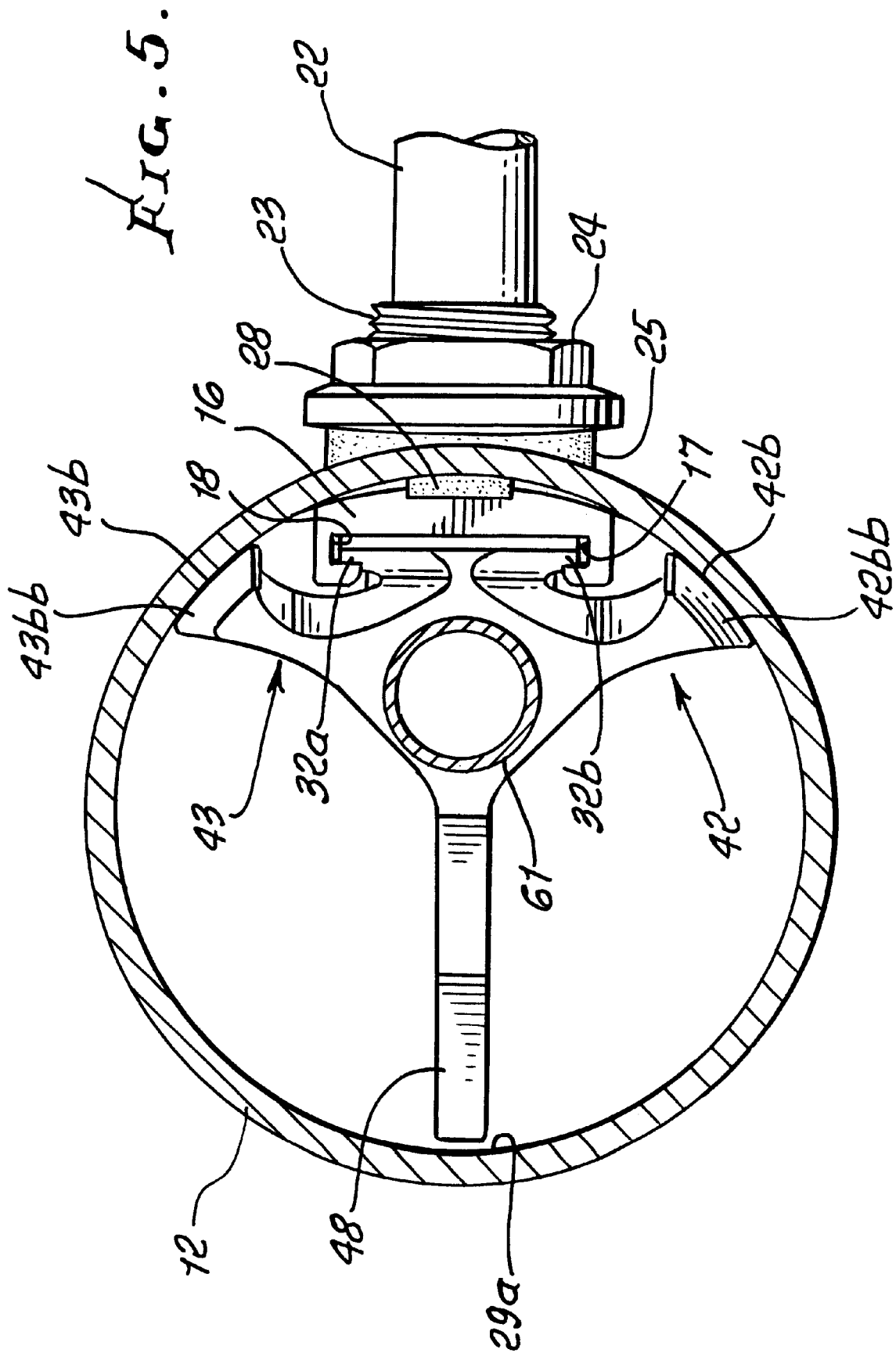
FIG. 5 is a section taken on lines 5—5 of FIG. 2.
Figure 6:
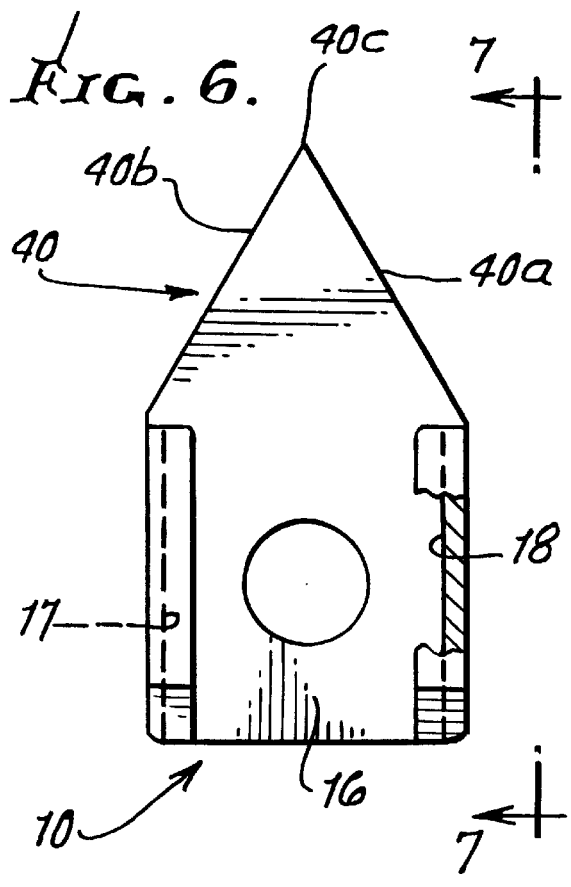
FIG. 6 is an enlarged elevation taken on lines 6—6 of FIG. 4.
Figure 7:
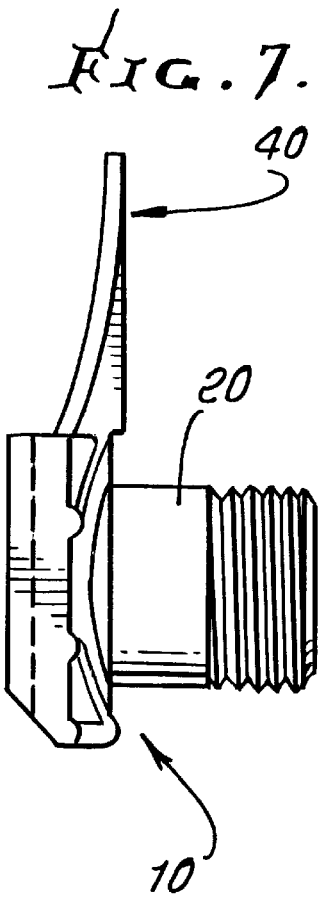
FIG. 7 is an edge elevation taken on lines 7—7 of FIG. 6.
Figure 8:
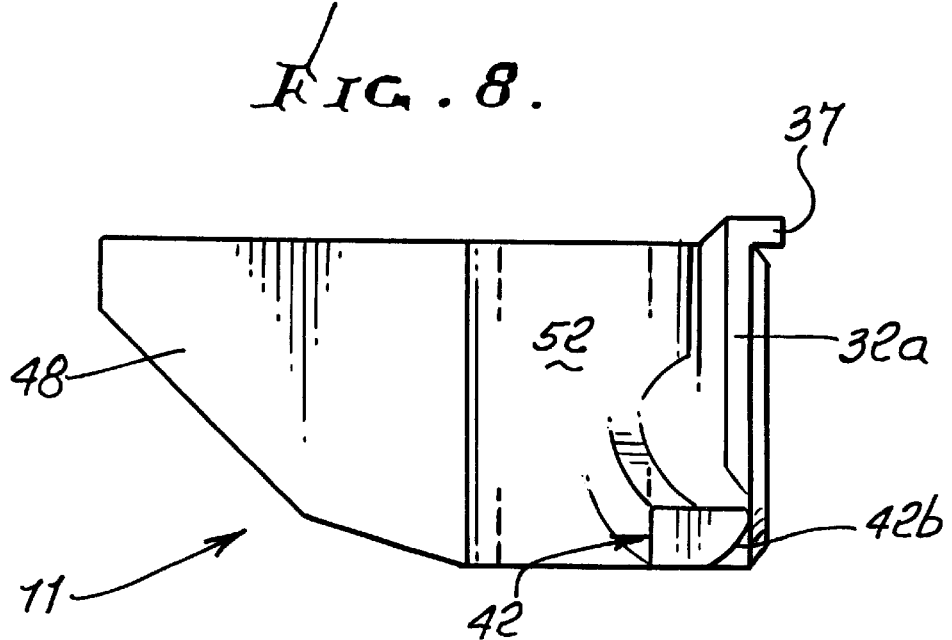
FIG. 8 is an enlarged side elevation, takne on lines 8—8 of FIG. 3.

Leg means is provided on the body 52 of the second structure 11 such leg means for example including two laterally spaced legs 42 and 43, to guidingly receive the cam therebetween and as seen in FIGS. 3, 4 and 5, the tongue 32 has lateral width less than the lateral spacing of legs 42 and 43. As the body 52 and legs are stabbed or lowered downwardly (i.e. lengthwise of the pipe), angled inner surfaces 42a and 43a of the legs come into engagement with the respective cam surfaces 40a and 40b, to rotate the body 52 so as to bring the tongue 32 into azimuthal alignment with the grooving 17 and 18 to enable reception of the tongue into the grooving. In this regard, a dog 48 integral with the body 52 projects toward the opposite inner side 29a of the pipe 12, to keep the tongue 32 close to the pipe inner side 29, as seen in FIG. 2, so that lateral guiding is established to enable tongue and groove interfit.

Legs 42 and 43 have convex outwardly projecting surfaces to slidably and guidingly engage the pipe bore, and aid in aligning and stabilizing the tongue and grooving, as referred to. Such surfaces appear at 42b and 43b in FIGS. 3 and 5, and have cylindricality matching that of the casing bore. Also, the surfaces 42bb and 43bb below 42b and 43b have downward and inward taper to guide leg entry into the casing.

It will be seen that flow passages are established at 60 in lower pipe 61 and at 62 in hollow body 52, to pass well fluid upwardly and then laterally, to pipe 22. Pipe 61 is threadably attached at 63 to body 52, and is adjustably moved in the well casing 12, by the manipulatable pipe or rod 50.

Figure 1:
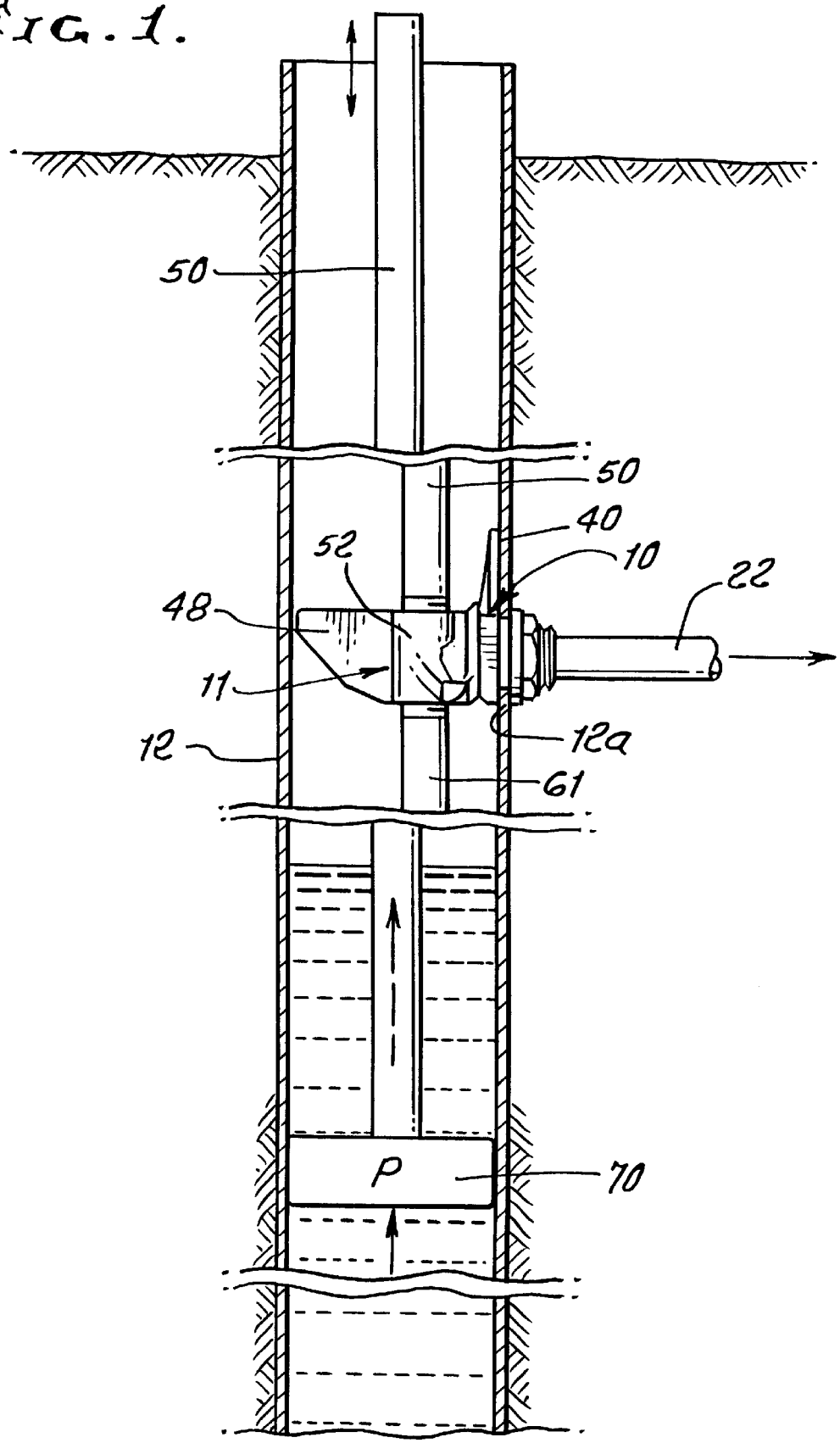
FIG. 1 is an enlarged section taken through a pipe that receives two structures, and showing them in interconnected relation.

A well pump P is seen at 70 in FIG. 1.

I claim:

1. For use in a longitudinally elongated pipe having a pipe wall, the combination comprising
   a) first and second relatively slidably interconnectible structures, the first structure to be carried by the pipe wall, and the second structure adapted for lengthwise movement in the pipe,
   b) said structures having slidably interconnectible interfitting tongue and groove elements,
   c) a cam on one of said structures,
   d) and at least one guide on the other of said structures, to interengage said cam in response to said relative lengthwise movement of the structures, for relatively aligning said structures to enable slidable interconnection thereof,
   e) said guide including two laterally spaced legs on the other structure to guidingly receive said cam therebetween,
   f) and wherein said tongue element has a lateral width less than lateral spacing defined by said legs.

2. The combination of claim 1 wherein there is a lengthwise extending projection on said one structure, which defines said cam.

3. The combination of claim 1 wherein said cam has guide camming surfaces which taper in the direction of pipe elongation.

4. The combination of claim 1 wherein said cam has camming surfaces which taper for guiding engagement with the respective legs, thereby to align the tongue and groove elements for slidable longitudinal interconnection.

5. The combination of claim 1 including a side nipple carried by the first structure to be received in a piper side wall port.

6. The combination of claim 5 wherein said groove element is carried by said first structure, said cam projecting generally lengthwise beyond said groove element.

7. The combination of claim 6 wherein said cam has guide camming surfaces which taper in the direction of pipe elongation, said groove element defining laterally spaced, longitudinally extending grooves.

8. The combination of claim 1 wherein said second structure includes a hollow body to which primary tubing is connected to extend lengthwise in said pipe.

9. The combination of claim 8 including secondary tubing connected to said hollow body to extend lengthwise in said pipe, and generally oppositely from said primary tubing.

10. The combination of claim 8 including a dogging means on the body to engage the pipe interior wall, thereby to position said guide proximate the pipe interior wall adjacent which said cam extends.

11. The combination of claim 1 wherein said legs have outer surface extent to guidingly engage the pipe bore.

12. The combination of claim 1 wherein the two legs have outwardly projecting curved surfaces to guidingly and slidably engage the pipe bore.

13. For use in longitudinally elongated pipe having a pipe wall, the combination comprising
   a) first and second relatively slidably interconnectible structures, the first structure to be carried by the pipe wall, and the second structure adapted for lengthwise movement in the pipe,
   b) said structures having slidably interconnectible interfitting tongue and groove elements,
   c) a cam on one of said structures,
   d) and a guide on the other of said structures, to interengage said cam in response to said relative lengthwise movement of the structures, for relatively aligning said structures to enable slidable interconnection thereof,
   e) said guide including two laterally spaced legs on the other structure to guidingly receive said cam therebetween,
   f) and wherein said tongue element is carried by the second structure, and has lateral width less than the lateral spacing of said legs.

14. The combination of claim 13 wherein said groove element defines laterally spaced longitudinally extending grooves to receive said tongue element.

* * * * *